US012334241B2

(12) United States Patent
Yoshizawa

(10) Patent No.: US 12,334,241 B2
(45) Date of Patent: Jun. 17, 2025

(54) COIL COMPONENT

(71) Applicant: TAIYO YUDEN CO., LTD., Tokyo (JP)

(72) Inventor: Takanori Yoshizawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 887 days.

(21) Appl. No.: 17/478,563

(22) Filed: Sep. 17, 2021

(65) Prior Publication Data

US 2022/0102051 A1 Mar. 31, 2022

(30) Foreign Application Priority Data

Sep. 30, 2020 (JP) ................................. 2020-164461

(51) Int. Cl.

| | |
|---|---|
| ***H01F 27/28*** | (2006.01) |
| ***H01F 27/255*** | (2006.01) |
| ***H01F 41/02*** | (2006.01) |
| *H01F 27/06* | (2006.01) |

(52) U.S. Cl.

CPC ....... *H01F 27/255* (2013.01); *H01F 41/0266* (2013.01); *H01F 2027/065* (2013.01)

(58) Field of Classification Search

CPC ............... H01F 27/255; H01F 41/0266; H01F 2027/065; H01F 2017/048; H01F 17/04

USPC .......................................... 336/105, 200, 232

See application file for complete search history.

(56) References Cited

U.S. PATENT DOCUMENTS

| | | | | |
|---|---|---|---|---|
| 2010/0065309 | A1* | 3/2010 | Shioda | H05K 1/0274 29/829 |
| 2015/0380151 | A1* | 12/2015 | Choi | H01F 41/041 336/200 |
| 2016/0012957 | A1* | 1/2016 | Lim | H01F 17/0013 336/200 |
| 2018/0061551 | A1* | 3/2018 | Kondou | H01F 41/122 |
| 2018/0315545 | A1* | 11/2018 | Kusumoto | H01F 27/363 |

FOREIGN PATENT DOCUMENTS

| | | |
|---|---|---|
| JP | 2004-327885 A | 11/2004 |
| JP | 2013-093403 A | 5/2013 |

* cited by examiner

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

A coil component according to one or more embodiments of the invention includes a base body, a coil conductor embedded in the base body, and an external electrode provided on the base body. The base body has on its surface a first region that has a first reflectance, a second region that has a second reflectance lower than the first reflectance, and a third region that is surrounded by the second region and has a third reflectance higher than the second reflectance. The third region has a shape of a sign.

13 Claims, 9 Drawing Sheets

COIL COMPONENT

CROSS-REFERENCE TO RELATED APPLICATIONS

This application is based on and claims the benefit of priority from Japanese Patent Application Serial No. 2020-164461 (filed on Sep. 30, 2020), the contents of which are hereby incorporated by reference in its entirety.

TECHNICAL FIELD

The present disclosure relates to a coil component, a circuit board including the coil component, and an electronic device including the circuit board. The present disclosure also relates to a method of manufacturing a coil component.

BACKGROUND

A sign may be provided to a surface of a base body of a coil component to convey information about the coil component. One example of such a sign on a coil component is text indicating the dimensions, model number, and other information about the coil component, and another example is a marker such as a graphic or symbol indicating the orientation or position of the coil component.

Japanese Patent Application Publication No. 2013-093403 ("the '403 Publication") describes an electronic component in which a print pattern representing characters is formed on a surface of the base body. This print pattern is printed by an inkjet printer. Japanese Patent Application Publication No. 2004-327885 ("the '885 Publication") describes a multilayer inductor with a marker for directional identification formed on its surface. The marker for directional identification described in "the '885 Publication" is formed of a material that is able to produce a great color and different from the base material (specifically, a material containing between 10 wt % and 30 wt % of borosilicate glass, between 50 wt % and 80 wt % of $TiO_2$, and the remainder of either $ZrO_2$ or $Al_2O_3$).

Since the sign formed on the surface of the base body is recognized by observing a photograph taken by an optical camera or by directly observing the surface of the base body with the naked eye, it is desirable that the sign on the base body surface is easily recognizable from other parts of the surface of the base body.

SUMMARY

One of the objects of the invention disclosed herein is to provide a novel technical improvement that makes it easier to recognize a sign on the surface of the base body of the coil component.

The other objects of the disclosure will be apparent with reference to the entire description in this specification. The invention disclosed herein may solve any other drawbacks grasped from the following description, instead of or in addition to the above drawback.

A coil component according to one or more aspects of the invention includes a base body, a coil conductor provided in the base body, and an external electrode provided on the base body. The base body has on its surface a first region that has a first reflectance, a second region that has a second reflectance lower than the first reflectance, and a third region that is surrounded by the second region and has a third reflectance higher than the second reflectance. The third region has a shape of a sign.

According to one or more aspects of the invention, the second reflectance at a wavelength of 700 nm may be 10% or less.

According to one or more aspects of the invention, the second reflectance at a wavelength of 700 nm may be 1% or more.

According to one or more aspects of the invention, the sign may include at least one of a character, number or symbol.

According to one or more aspects of the invention, the surface of the base body is defined by a plurality of surfaces, and the second region may occupy a whole one surface of the plurality of surfaces. According to one or more aspects of the invention, the second region may occupy a part of one surface of the plurality of surfaces.

According to one or more aspect of the invention, the base body may be formed of an Ni—Zn based ferrite material.

According to one or more aspects of the invention, the base body may be formed of a magnetic material containing metal magnetic particles.

One or more aspects of the invention relate to a circuit board including the coil component according to any one of the aspects of the invention. Another aspect of the invention relates to an electronic device comprising the above circuit board.

The electronic device includes the circuit board according to the one or more aspects of the invention.

A method of manufacturing a coil component according to one or more aspects of the invention includes: fabricating a blank body from a magnetic material, the blank body including a conductor thereinside and having a surface that has a first reflectance; forming a low reflectance region in a part of the surface of the blank body, the low reflectance region having a second reflectance lower than the first reflectance; and forming a sign region in the low reflectance region, the sign region having a third reflectance higher than the second reflectance and having a shape of a sign.

A method of manufacturing a coil component according to one or more aspects of the invention includes: fabricating a blank body from a magnetic material, the blank body being defined by a surface having a first reflectance; forming a low reflectance region in a part of the surface of the blank body, the low reflectance region having a second reflectance lower than the first reflectance; forming a sign region in the low reflectance region, the sign region having a third reflectance higher than the second reflectance and having a shape of a sign; and winding a wire around the blank body.

According to one or more aspects of the invention, the low reflectance region may be formed by laser processing.

According to one or more aspects of the invention, the low reflectance region may be formed by blasting.

According to one or more aspects of the invention, the sign region may be formed by laser processing.

Advantageous Effects

According to one or more aspects of the invention, the sign on the surface of the base body of the coil component can be easily recognized.

DESCRIPTION OF THE PREFERRED EMBODIMENTS

Various embodiments of the present invention will be hereinafter described with reference to the accompanying drawings. The constituents common to multiple drawings are denoted by the same reference signs throughout the drawings. For convenience of explanation, the drawings are not necessarily drawn to scale.

Figure 1:
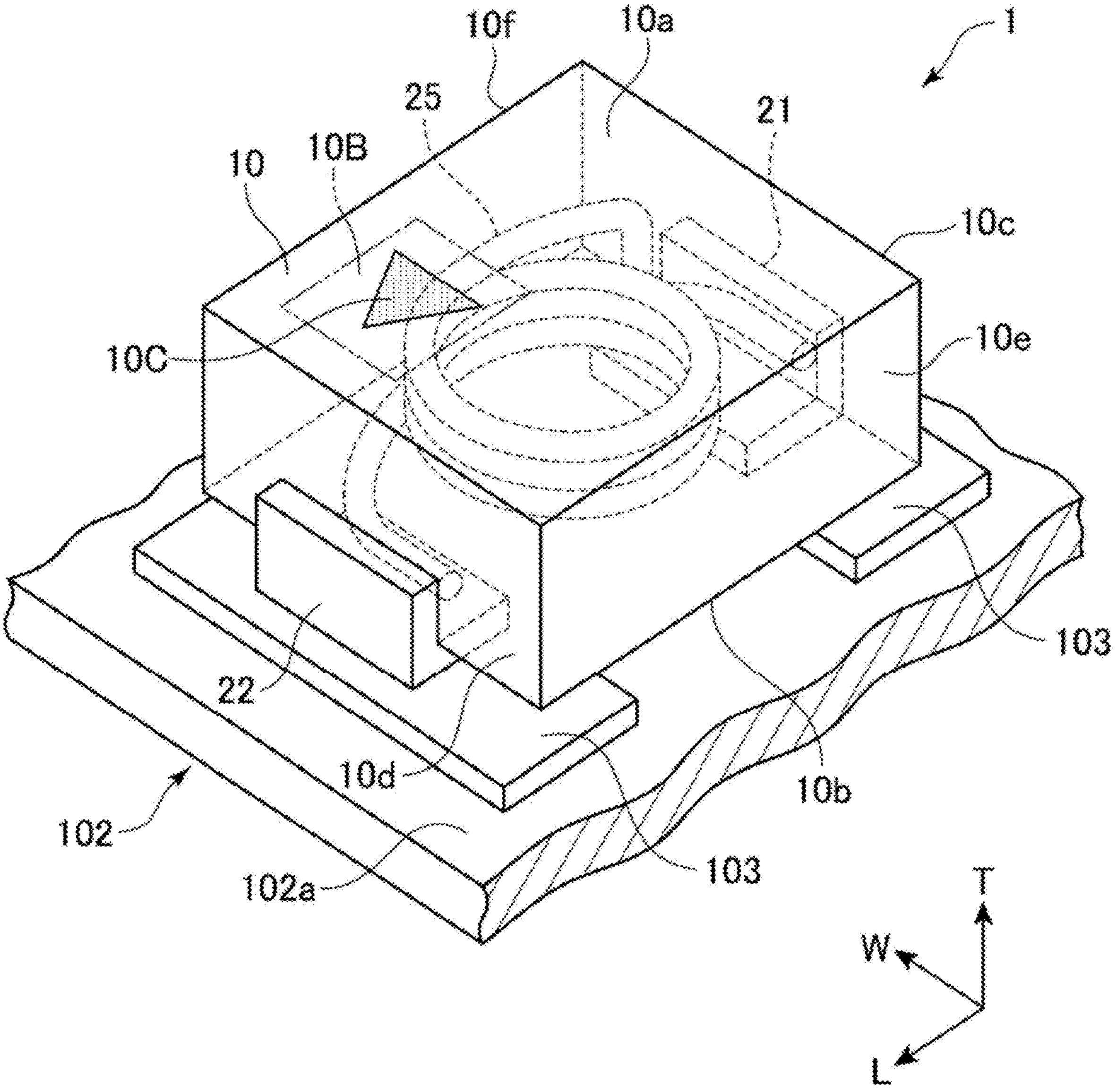
FIG. 1 is a perspective view of a coil component according to one embodiment of the invention.

A coil component 1 according to one embodiment of the invention will be hereinafter described with reference to FIGS. 1 and 2. FIG. 1 is a perspective view of the coil component 1 according to the embodiment of the invention, and FIG. 2 is a plan view of the coil component 1 shown in FIG. 1.

The coil component 1 is, for example, an inductor. The inductor is an example of the coil component to which the invention can be applied to. The invention can also be applied to transformers, filters, reactors, and various any other coil components. Advantageous effects of the invention will be more remarkably exhibited if the invention is applied to coil components and any other electronic components to which large current is applied. An inductor used in a DC-DC converter is an example of a coil component to which large current is applied. The invention may be also applied to coupled inductors, choke coils, and any other magnetically coupled coil components, in addition to the inductors used in DC-DC converters. Applications of the coil component 1 are not limited to those explicitly described herein.

Figure 2:
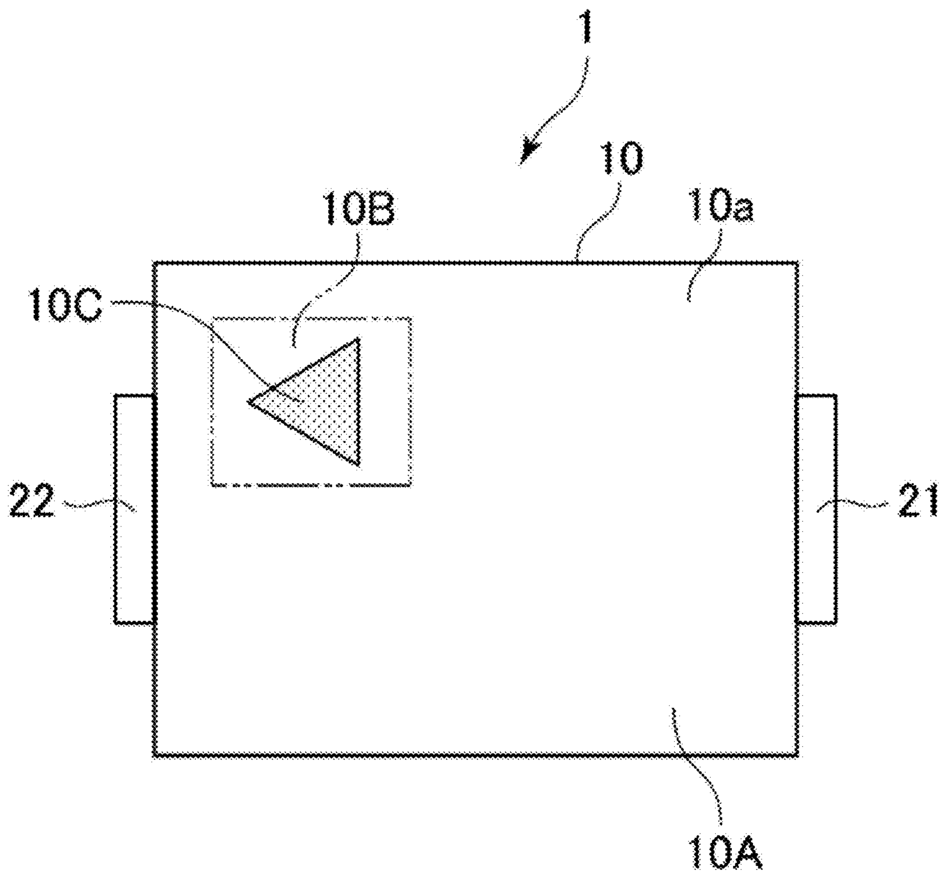
FIG. 2 is a plan view of the coil component of FIG. 1.

As shown in FIGS. 1 and 2, the coil component 1 includes a base body 10 made of a magnetic material, a coil conductor 25 embedded in the magnetic base body, an external electrode 21 electrically connected to one end of the coil conductor 25, and an external electrode 22 electrically connected to the other end of the coil conductor 25.

The illustrated coil component 1 is mounted on a mounting substrate 102*a*. The mounting substrate 102*a* may have land portions 103 provided thereon. In the case where the coil component 1 includes two external electrodes 21 and 22, the mounting substrate 102*a* is provided with two landing portions 103 correspondingly. The coil component 1 may be mounted on the mounting substrate 102*a* by joining the external electrodes 21, 22 to the corresponding land portions 103 of the mounting substrate 102*a*. A circuit board 102 according to one embodiment includes the mounting substrate 102*a* and the coil component 1 mounted on the mounting substrate 102*a*. The circuit board 102 can be installed in various electronic devices. Electronic devices in which the circuit board 102 may be installed include smartphones, tablets, game consoles, electrical components of automobiles, servers, and various other electronic devices. The coil component 1 may be embedded in the mounting substrate 102*a*.

The base body 10 has a substantially rectangular parallelepiped shape. In this specification, a "length" direction, a "width" direction, and a "thickness" direction of the coil component 1 correspond to the "L axis" direction, the "W axis" direction, and the "T axis" direction in FIG. 1, respectively, unless otherwise construed from the context. In one embodiment of the invention, the base body 10 has a length (the dimension in the L axis direction) of 1.0 to 6.0 mm, a width (the dimension in the W axis direction) of 0.5 to 6.0 mm, and a thickness (the dimension in the T axis direction) of 0.5 to 3.0 mm. The length of the magnetic base body may be 0.3 to 1.6 mm, the width may be 0.1 to 0.8 mm, and the thickness may be 0.1 to 0.8 mm.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. As shown in FIG. 1, the first principal surface 10*a* lies on the top side in the magnetic base body 10, and therefore, the first principal surface 10*a* may be herein referred to as "the top surface." Similarly, the second principal surface 10*b* may be referred to as "the bottom surface." The coil component 1 is disposed such that the second principal surface 10*b* faces a circuit board 102, and therefore, the second principal surface 10*b* may be herein referred to as a "mounting surface." The top-bottom direction of the coil component 1 refers to the top-bottom direction (the direction along the axis T) in FIG. 1.

The external electrode 21 is provided on the first end surface 10*c* of the base body 10. The external electrode 22 is provided on the second end surface 10*d* of the base body 10. As shown, these external electrodes may extend to the bottom surface of the base body 10. The shapes and positions of the external electrodes are not limited to the illustrated example. For example, both of the external electrodes 21, 22 may be provided on the bottom surface 10*b* of the base body 10. The external electrodes 21 and 22 are separated from each other in the length direction.

The base body 10 is made of a magnetic material. The base body 10 includes, for example, a sintered body made of a sintered ferrite material. As the ferrite material for the base body 10, a Mn—Zn based ferrite, a Ni—Zn based ferrite, or a ferrite material other than the aforementioned can be used. The base body 10 may be composed of a magnetic material other than ferrite materials. For example, the base body 10 may include metal magnetic particles formed of a soft magnetic metal material, a soft magnetic alloy material, or any other known magnetic materials. In the base body 10, the metal magnetic particles may be bonded to each other by an oxide film formed on the surface of each particle through a heat treatment. The metal magnetic particles may be a particle mixture obtained by mixing two or more types of particles having different average particle sizes. The metal magnetic particles in the base body 10 may be bonded to each other with a resin binder. As will be described later, in the process of fabricating the base body 10, the surface of the base body 10 is laser processed. When the base body 10 includes a resin, such as a binder, the resin should be one that does not thermally decompose (not carbonized by laser processing). When the base body 10 includes a resin, a resin that is not carbonized under the irradiation conditions during the laser processing is selected.

In one or more embodiments of the invention, the surface of the base body 10 is divided into a high reflectance region 10A and a low reflectance region 10B surrounded by the high reflectance region 10A. Further, the base body 10 has a sign region 10C situated on the inner side of the low reflectance region 10B on the surface thereof.

The reflectance of the high reflectance region 10A is referred to as a first reflectance. A second reflectance, which is the reflectance of the low reflectance region 10B, is lower than the first reflectance, which is the reflectance of the high reflectance region 10A. A third reflectance, which is the reflectance of the sign region 10C, is higher than the second reflectance of the low reflectance region 10B. The third reflectance may be equal to or higher than the first reflectance. The first, second, and third reflectances may be measured for the high reflectance region 10A, the low reflectance region 10B, and the sign region 10C, respectively using a Hitachi High-Tech Corporation (formerly "Hitachi High-Technologies Corporation") U-4100 spectrophotometer at 25° C. at a wavelength of 700 nmm and at an incident angle of 10 degrees. The reflectance of the base body 10 may be, for example, a relative value measured by a relative reflection measurement method. To measure the reflectance of the base body 10, an integrating sphere is attached to a spectrophotometer, a barium sulfate white plate is used as a reference sample for baseline correction. After the correction, the base body 10 is placed in a measurement sample placing area of the integrating sphere in place of the reference sample, the surface of the base body 10 is irradiated with a measurement light from a light source, and light reflected from the surface of the base body 10 is detected by a detector. This relative reflectance measurement method can be used to determine the relative reflectance of the base body 10 with reference to the reference sample. The labels "high" reflectance region 10A and "low" reflectance region 10B focus on the relative reflectance of the high reflectance region 10A to that of the low reflectance region 10B, and do not necessarily mean that the high reflectance region 10A has an absolutely high reflectance. The first reflectance of the high reflectance region 10A may be, for example, 12% or more, 15% or more, 20% or more, 30% or more, 40% or more, or 50% or more. The second reflectance of the low reflectance region 10B may be, for example, 10% or less, 12% or less, 16% or less, 25% or less, 33% or less, or 42% or less, when the first reflectance of the high reflectance region 10A is 12% or more, 15% or more, 20% or more, 30% or more, 40% or more, or 50% or more, respectively. The third reflectance of the sign region 10C may be 20% or more, 30% or more, 40% or more, 50% or more, or 60% or more, when the second reflectance of the low reflectance region 10B is 10% or less, 12% or less, 16% or less, 25 or less, 33% or less, or 42% or less, respectively. The first reflectance of the high reflectance region 10A may be, for example, more than 1.2 times, 1.5 times, or 2 times higher than the second reflectance of the low reflectance region 10B. The third reflectance of the sign region 10C may be, for example, more than 1.2 times, 1.5 times, or 2 times higher than the second reflectance of the low reflectance region 10B.

In one or more embodiments of the invention, the low reflectance region 10B occupies a portion of the surface of the base body 10. In the illustrated example, the low reflectance region 10B is provided in a portion of a top surface 10*a* of the base body 10. In the example shown in FIG. 2, the low reflectance region 10B is disposed near the upper left corner of the top surface 10*a* in the paper plane, but the arrangement of the low reflectance region 10B is not limited to this. The low reflectance region 10B may be situated at any position in the top surface 10*a*. The low reflectance region 10B may be provided on a surface other than the top surface 10*a* of the base body 10. The low reflectance region 10B may be provided not only on a single surface of the base body 10 (the top surface 10*a* in the example of FIG. 2), but may also be provided across two or more surfaces. For example, the low reflectance region 10B may be provided on the base body 10 such that it spans the top surface 10*a* and the first end surface 10*c*. When the low reflectance region 10B spans two or more surfaces, the sign 15 may also be formed such that it spans two or more surfaces in accordance with the arrangement of the low reflectance region 10B. Two or more low reflectance regions 10B may be formed on the base body 10.

Figure 4:
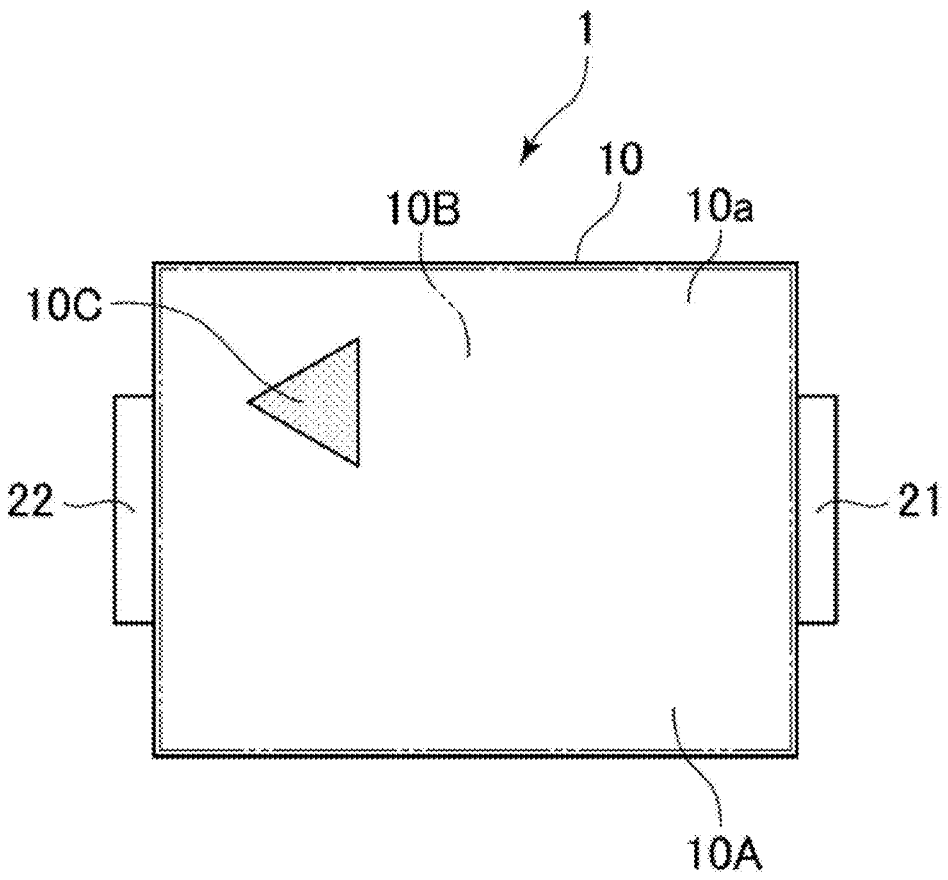
FIG. 4 is a plan view of the coil component according to another embodiment of the invention.

FIG. 4 is a top view of the coil component 1 according to another embodiment of the invention. In the coil component 1 shown in FIG. 4, the low reflectance region 10B occupies the whole top surface 10*a* of the base body 10. In this way, the low reflectance region may cover the whole of one or more of the surfaces defining the base body 10.

In one or more embodiments of the invention, the low reflectance region 10B may be formed by first fabricating a blank body from a magnetic material according to a conventional method and roughening a portion of the surface of the fabricated blank body. In one or more embodiments of the invention, the low reflectance region 10B is formed, for example, by applying a blasting process onto at least one of the surfaces of the blank body formed of the magnetic material. The low reflectance region 10B may be provided on the surface of the blank body by any surface processing method other than blasting. For example, the low reflectance region 10B is formed by laser processing a portion of the surface of the blank body formed of the magnetic material. When forming the low reflectance region 10B by blasting, it is necessary to mask the blank body except for the area that will later serve as the low reflectance region 10B. Whereas when forming the low reflectance region 10B by laser processing, such masking is not necessary. Further when blasting is performed without masking, the whole surface is blasted and polished so that the base body 10 diminishes in size. Whereas the laser processing can roughen the entire surface without such size reduction.

The high reflectance region 10A is an area of the surface of the base body 10 other than the low reflectance region 10B. The high reflectance region 10A occupies a part or all of the area of the surface of the base body 10 other than the low reflectance region 10B. As shown in FIG. 4, the high reflectance region 10A may be formed on a surface of the base body 10 that is different from the surface on which the low reflectance region 10B is formed.

In the embodiment shown in FIG. 2, the sign region 10C is formed in a shape of a symbol, which is a triangle that can indicate the orientation or position of the coil component 1 in the illustrated embodiment. The sign region 10C may be formed in a shape of a symbol other than a triangle.

Figure 5:
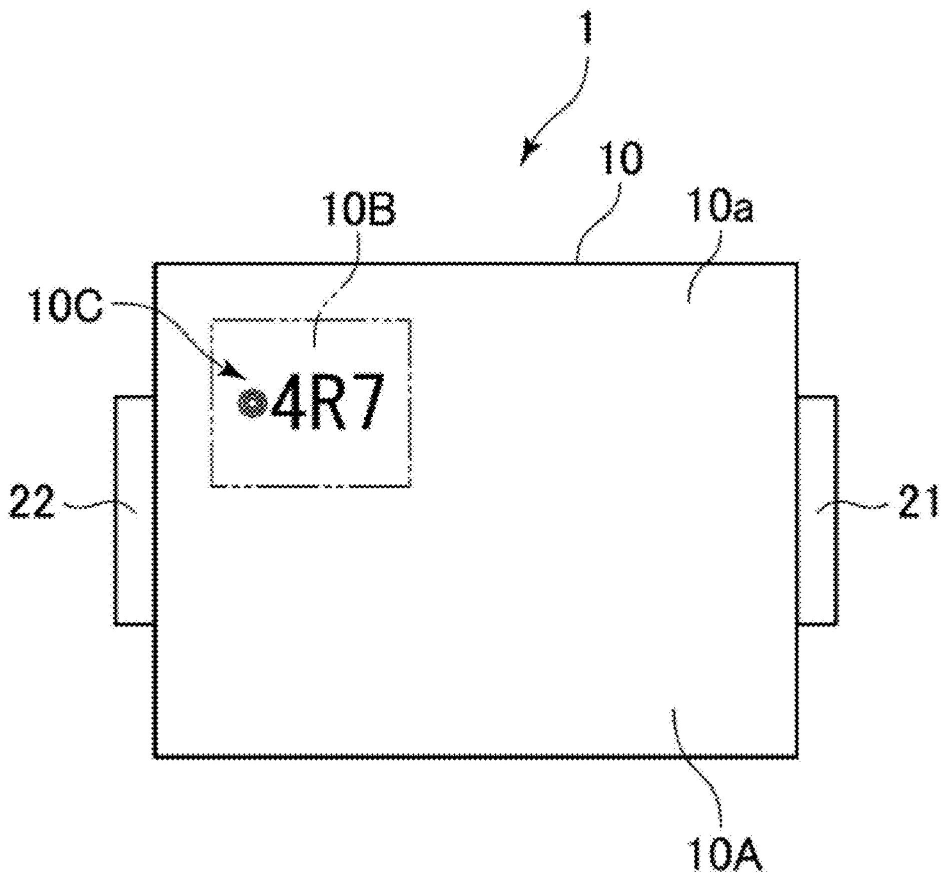
FIG. 5 is a plan view of the coil component according to another embodiment of the invention.

The sign region 10C may be a character(s) or number(s) indicating various information about the coil component 1 in addition to the orientation and position of the coil component 1. FIG. 5 is a top view of the coil component 1 according to yet another embodiment of the invention. In the coil component 1 shown in FIG. 5, a sign region 10C is formed in the low reflectance region 10B, instead of the sign region 10C of FIG. 2. The sign region 10C includes numbers and an alphabet in addition to a geometric shape. In this embodiment, the portion consisting of a number(s) and alphabet(s) represents specifically "4R7." In the art of the invention, the label "4R7" is typically considered to represent the electrical characteristics (L-value and Z-value) of the coil component 1. In addition to the electrical characteristics of the coil component 1, the sign region 10C may be a number(s) or character(s) representing a model number, rated current, dimensions, any other specifications, or any other information about the coil component 1, or a combination of a number(s), character(s), and symbol(s) (or geometric shape(s)).

In one or more embodiments of the invention, the sign region 10C is formed by laser processing the low reflectance region 10B of the blank body formed of a magnetic material. In the laser processing, a laser irradiation device irradiates a laser beam onto an area of a figure corresponding to the sign region 10C in the low reflectance region 10B of the surface of the blank body. By irradiating the laser with predetermined irradiation conditions onto the roughened low reflectance region 10B, the base body 10 melts in the laser-irradiated area in the low reflectance region 10B. The laser-irradiated area in the low reflectance region 10B is dented and becomes smoother than a non-laser-irradiated area in the low reflectance region 10B.

In one or more embodiments, an arithmetic surface roughness Ra of the high reflectance region 10A is smaller than an arithmetic surface roughness Ra of the low reflectance region 10B, and an arithmetic mean roughness Ra of the sign region 10C is smaller than an arithmetic mean roughness Ra of the low reflectance region 10B. For example, the arithmetic surface roughness Ra of the high reflectance region 10A may be between 0.05 μm and 0.3 μm, or between 0.1 μm and 0.2 μm (both inclusive). For example, the arithmetic surface roughness Ra of the low reflectance region 10B may be between 0.2 μm and 0.6 μm, or between 0.3 μm and 0.5 μm (both inclusive). For example, the arithmetic mean roughness Ra of the sign region 10C may be between 0.05 μm and 0.25 μm, or between 0.07 μm and 0.15 μm (both inclusive). When the low reflectance region 10B is formed by roughening the high reflectance region 10A, the arithmetic mean surface roughness Ra of the low reflectance region 10B is larger than the arithmetic mean roughness Ra of the high reflectance region 10A. When the sign region 10C is formed by laser processing (laser printing), the arithmetic mean roughness Ra of the sign region 10C becomes smaller than the arithmetic mean roughness Ra of the low reflectance region 10B. The arithmetic surface roughness Ra described herein is measured in accordance with the Japanese Industrial Standard JIS B 0601:2013.

Figure 3:
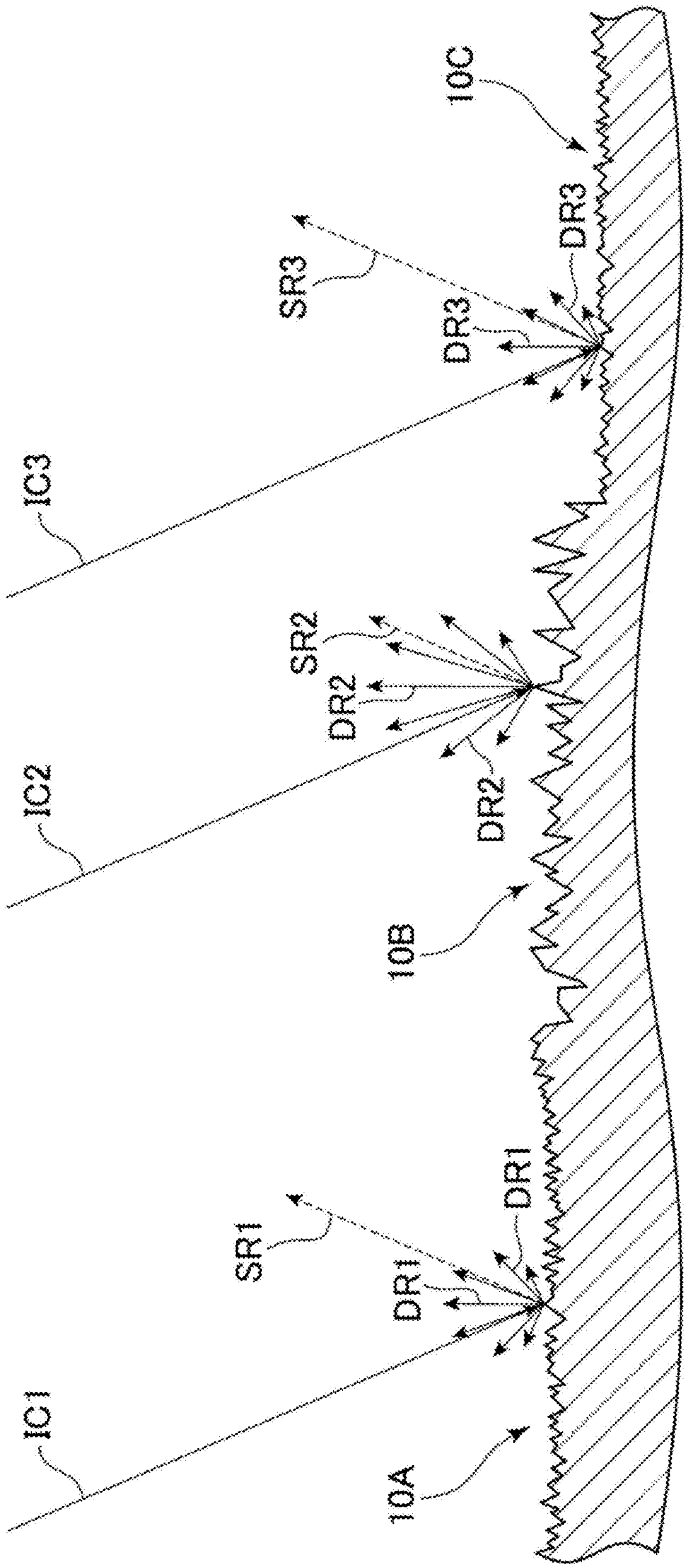
FIG. 3 illustrates light reflection that occurs on a surface of the coil component of FIG. 1.

Referring to FIG. 3, reflection of the light after the incidence on the surface of the base body 10 will be now described. When the incident light enters the surface of the base body 10, specular and diffuse reflections occur on the surface of the base body (reflection surface). The incident light entered the surface of the base body 10 is specularly and diffusely reflected in each of the high reflectance region 10A, the low reflectance region 10B, and the sign region 10C. Reflection angles of reflected light SR1, SR2, and SR3 specularly reflected in the high reflectance region 10A, the low reflectance region 10B, and the sign region 10C, respectively on the surface of the base body 10 are equal to incident angles of incident light IC1, IC2, and IC3 entered into the respective regions. Diffusely reflected light DR1, DR2, and DR3 in the highly reflectance region 10A, the low reflectance region 10B, and the sign region 10C, respectively on the surface of the base body 10 travel in various directions in addition to the directions traveled by the specularly reflected light SR1, SR2, and SR3.

In FIG. 3, the intensity of the specularly reflected light SR1, SR2, SR3 and the diffusely reflected light DR1, DR2, DR3 are represented by the length of the respective arrows. In general, the higher the reflectance of the reflection surface, the higher the light intensity of the specularly reflected light and the lower the light intensity of the diffusely reflected light. Conversely, the lower the reflectance of the reflection surface, the lower the light intensity of the specularly reflected light and the higher the light intensity of the diffusely reflected light. As described above, the second reflectance, which is the reflectance of the low reflectance region 10B, is lower than the first reflectance, which is the reflectance of the high reflectance region 10A. Therefore, the intensity of the light SR2 specularly reflected in the low reflectance region 10B is lower than that of the light SR1 specularly reflected in the high reflectance region 10A. The intensity of the light SR1 and SR2 are represented by the length of the respective arrows of SR1 and SR2 in FIG. 3. Similarly, since the second reflectance, which is the reflectance of the low reflectance region 10B, is lower than the third reflectance, which is the reflectance of the sign region 10C, the intensity of the light SR2 specularly reflected in the low reflectance region 10B is lower than the intensity of the light SR3 specularly reflected in the sign region 10C, which is represented by the arrow lengths of SR2 and SR3.

Since the second reflectance of the low reflectance region 10B is lower than the first reflectance of the high reflectance region 10A, the intensity of the light DR2 diffusely reflected in the low reflectance region 10B is higher than that of the light DR1 diffusely reflected in the high reflectance region 10A. The intensity of the light DR1 and DR2 are represented by the length of the respective arrows of DR1 and DR2 in FIG. 3. Similarly, since the second reflectance of the low reflectance region 10B is lower than the third reflectance of the reflectance of the sign region 10C, the intensity of the light DR2 diffusely reflected in the low reflectance region 10B is lower than the intensity of the light DR3 diffusely reflected in the sign region 10C, which is represented by the arrow lengths of DR2 and DR3.

The sign region 10C on the surface of the base body 10 is determined based on an image obtained by photographing the surface of the base body 10 with an image capturing device (not shown). When an image of the surface of the base body 10 is taken by the image capturing device, the light reflected by the surface of the base body 10 is received by an image sensor of the image capturing device. A RAW image is generated by quantizing an electrical signal obtained by converting the received light, and the RAW image is processed by an image processing engine to obtain an image in a predetermined format. Whether the sign region 10C in the surface of the base body 10 can be easily recognized or not is affected by a difference between the intensity of the light reflected by the sign region 10C and received by the image sensor and the intensity of the light reflected by the low reflectance region 10B provided around the sign region 10C and received by the image sensor. More specifically, by increasing the difference between the intensity of the light reflected by the low reflectance region 10B around the labeling region 10C and then received by the image sensor and the intensity of the light reflected by the sign region 10C and then received by the image sensor, it is possible to increase the light-dark difference (contrast) between the sign region 10C and the surrounding low reflectance region 10B in the image of the surface of the base body 10 obtained by the image capturing device, and as a result, the sign becomes easier to be recognized.

The light (SR1, SR2, SR3) specularly reflected by the surface of the base body 10 is received by the image sensor disposed in a reflection direction symmetrical to the incident direction of the incident light with respect to the normal of the reflection surface, but not by the image sensor located off the reflection direction. On the other hand, the light diffusely reflected by the surface of the base body 10 travels in various directions from the reflection surface, so it is also received by the image sensor(s) located off the traveling direction of the specularly reflected light.

When taking an image of the base body 10 that has the sign region 10C on its surface, it will be cumbersome if the image sensor and the light source need to be arranged such that the image sensor is in the reflection direction symmetrical to the incident direction of the light with respect to the normal of the reflection surface (i.e., in the direction of travel of the specularly reflected light SR1, SR2, SR3). In addition, when the image sensor and the light source are integrated into a single image capturing device, it may not be possible to place the image sensor in the reflection direction symmetrical to the incident direction of the light from the light source. In addition to the light incident from the light source of the image capturing device, the surface of the base body 10 receives multiple types of incident light, such as light emitted from room lights installed in the observation environment, ambient light, and light emitted from the light source and reflected by other objects. It is not practical to determine the incident direction of each of these incident lights and determine the arrangement of the image sensor in relation to these incident directions. When the image capturing device takes an image of whole electronic components mounted at different positions on the circuit board, it is not possible in principle to determine just one optimal arrangement of the image capturing device for all of the plurality of components. For this reason, when capturing an image of the base body having a sign on its surface, positioning of the image sensor in the travel direction of the incident light after being reflected. Therefore, of the light reflected from the surface of the base body 10, most of the light that enters the image sensor is the diffusely reflected light rather than the specularly reflected light. In other words, in the reflected light received by the image sensor, the ratio of the diffuse reflection component is higher than that of the specular reflection component. Therefore, in the image of the surface of the base body 10 obtained by photographing, the low-reflectance region, where the intensity of diffusely reflected light is higher, is displayed brighter (or whiter, if the image is binarized). Therefore, in the illustrated embodiment, the image of the surface of the base body 10 shows the low reflectance region 10B relatively bright and the high reflectance region 10A and the sign region 10C relatively dark.

Figure 6A:
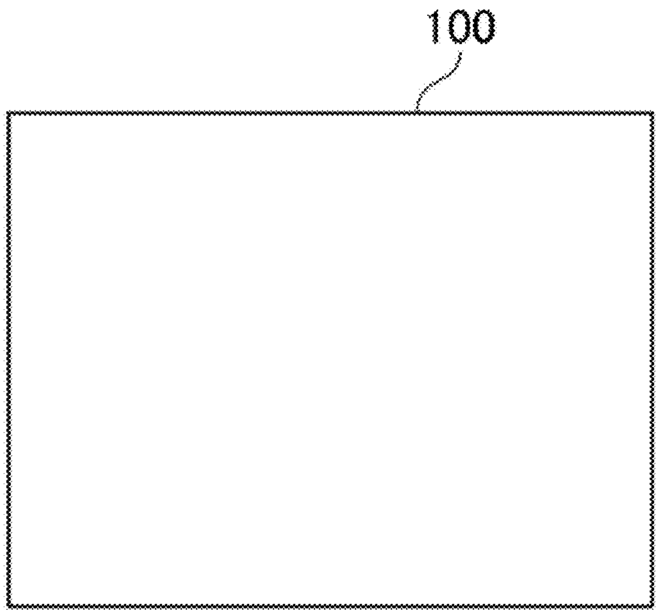
FIG. 6A illustrates a method of manufacturing the coil component of FIG. 1.
Figure 6B:
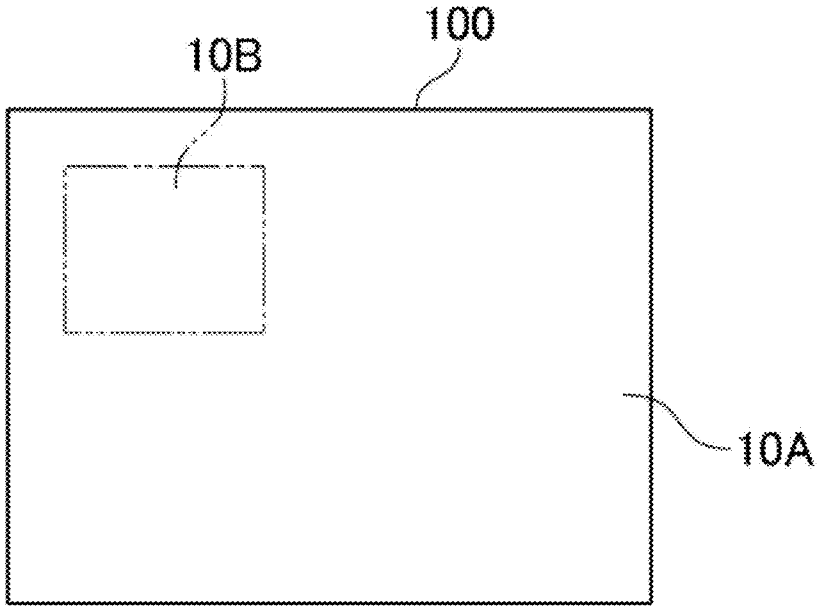
FIG. 6B illustrates the method of manufacturing the coil component of FIG. 1.
Figure 6C:
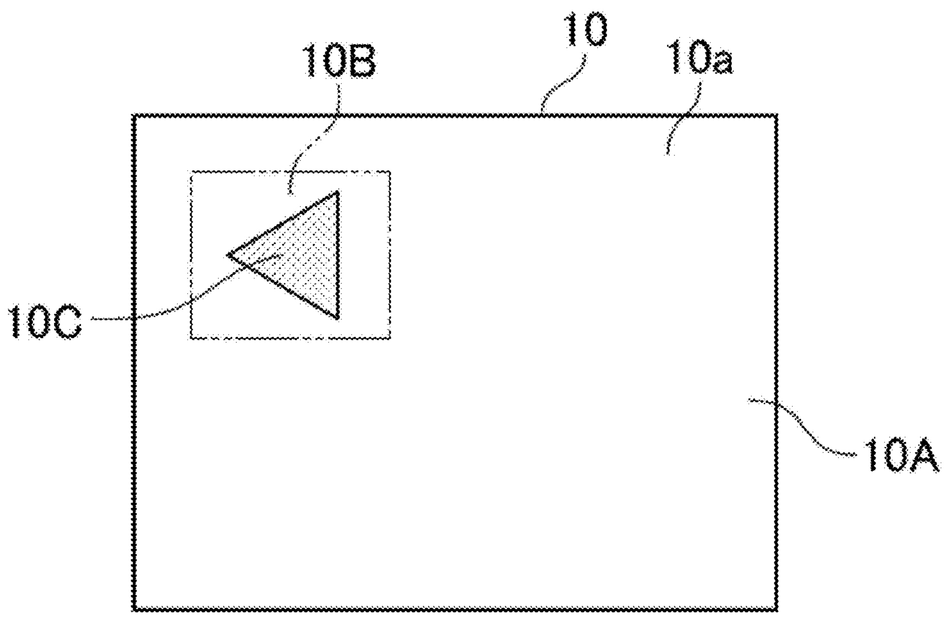
FIG. 6C illustrates the method of manufacturing the coil component of FIG. 1.

Next, with reference to FIGS. 6A to 6C, a description is given of a method of manufacturing the coil component 1 according to one or more embodiments of the invention. The method of manufacturing the coil component 1 according to one or more embodiments of the invention includes a step of fabricating the blank body of a magnetic material that includes a conductor thereinside, a step of forming the low reflectance region on the surface of the blank body, and a step of forming a sign on the low reflectance region.

The coil component 1 is manufactured by, for example, a compression molding process. The coil component 1 may be manufactured by any known method in addition to the compression molding process. For example, the coil component 1 may be manufactured by a sheet lamination method, a printing lamination method, a thin-film process method, and a slurry build method. In the following, it is assumed that the coil component 1 is manufactured by the compression molding process.

In the manufacturing method of the coil component 1, a blank body 100 that includes the coil conductor 25 thereinside and whose surface has the first reflectance is first fabricated as shown in FIG. 6A. The blank body 100 is made of a magnetic material and has the coil conductor 25 thereinside. In the step of fabricating the blank body 100, first, a plurality of metal magnetic particles and a binder resin are kneaded while being heated to produce a mixed resin composition. Subsequently, the coil conductor 25 prepared in advance is disposed in a molding die, and the molding die containing the coil conductor 25 is filled with the mixed resin composition. A compression pressure (for example, 500 kN to 5000 kN) is then applied to the mixed resin composition in the molding die to obtain a molded body. A heat treatment is subsequently performed to heat the molded body, and the blank body 100 with the coil conductor 25 thereinside is obtained. In the heat treatment process, the temperature of the molded body is raised to a predetermined heating temperature (e.g., 550° C. to 850° C.), and the molded body is heated at this heating temperature for a predetermined processing time (e.g., 30 minutes to 240 minutes). Through this heat treatment, the binder resin is degreased while the temperature raises, and adjacent ones of the plurality of metal magnetic particles are bonded to each other with the oxide film formed on their surfaces. The degreasing of the binder resin may be performed as a separate heat treatment process from the heat treatment described above. For example, by adding a low-melting-point glass to the mixed resin composition and heat-treating the molded body obtained by molding the mixed resin composition including the low-melting-point glass in a low-oxygen or nitrogen atmosphere, adjacent ones of the plurality of metal magnetic particles may be bonded together by the glass that serves as the binder. The blank body 100 fabricated by the heat treatment is subjected to a polishing treatment such as barrel polishing as necessary.

As shown in FIG. 6B, the low reflectance region 10B having the second reflectance lower than the first reflectance is formed on a surface of the blank body. The low reflectance region 10B is formed by laser processing a portion of the surface of the blank body 100. In the laser processing, a laser is irradiated by a laser irradiation device on the portion of the surface of the blank body 100 to roughen this portion. The roughened portion of the blank body 100 becomes the low reflectance region 10B, and the unroughened area becomes the high reflectance region 10A. As the laser irradiation device, the ML-9100 manufactured by Amada Miyachi Co., Ltd. can be used. The roughening process to roughen a part of the base body may be performed by blasting instead of or in addition to the laser irradiation.

As shown in FIG. 6C, the sign region 10C is formed in the low reflectance region 10B. As described above, the base body 10 is obtained. The sign region 10C is formed by laser processing a part of the low reflectance region 10B in the surface of the blank body 100. As the laser irradiation device for forming the sign region 10C, a YV04 laser marker MD-X1000 manufactured by Keyence Corporation can be used. By laser-irradiating the low reflectance region 10B with predetermined irradiation conditions, the irradiated area of the low reflectance region 10B is melted, and the melted material sublimates. As a result, the laser-irradiated area is recessed and smoothed more than the low reflectance region 10B. The sign region 10C has the third reflectance higher than the second reflectance of the low reflectance region 10B.

Next, a conductor paste is applied to both end portions of the base body 10, which is produced in the above-described manner, and the conductive paste is baked to form the external electrode 21 and the external electrode 22. The external electrodes 21 and 22 may be formed by sequentially performing Ni plating and Sn plating on the surface of the baked Ag paste. The external electrode 21 and the external electrode 22 are provided such that they are electrically coupled to corresponding ends of the coil conductor 25 provided in the base body 10. The external electrodes 21 and 22 may be provided on the blank body 100 before the low reflectance region 10B and the sign region 10C are formed. In this case, the blank body 100 on which the external electrodes 21 and 22 are provided is subjected to the process of forming the low reflectance region 10B and the sign region 10C and/or the sign region 10C.

As described above, the coil component 1 that has the low reflectance region 10B, the sign region 10C and/or the sign region 10C formed on the surface of the base body 10. The manufactured coil component 1 is mounted on a substrate 2 using a reflow process. In this process, the substrate 2 having the coil component 1 disposed thereon passes at a high speed through a reflow furnace heated to, for example, a peak temperature of 260° C., and then the external electrodes 21, 22 are soldered to the corresponding land portions 3 of the substrate 2. In this way, the coil component 1 is mounted on the substrate 2, and thus the circuit board 102 is manufactured.

The illustrated coil component 1 is an example of a coil component to which the invention can be applied. The invention can also be applied to any other types of coils. For example, the present invention can be applied to a wire-wound coil component in which a wire is wound around a compression core formed of a magnetic material. The wire-wound coil component has a compression core and a winding around the compression core. In such a wire-wound coil component, the compression core corresponds to the base body 10. The low reflectance region 10B and the sign region 10C and/or the sign region 10C are formed on the surface of this compression core. Next, a description is given of an example of a manufacturing method of the wire-wound coil component 1. The compression core is first fabricated. For example, a Ni—Zn ferrite material is mixed with a binder resin, the mixture is compression molded using a molding die to obtain a drum-shaped molded body, and the molded body is sintered at a prescribed sintering temperature to obtain the compression core. The low reflectance region 10B is formed on the surface of this compression core in the same manner as described above, and the sign region 10C is formed in the low reflectance region 10B.

EXAMPLES

Next, examples will now be described. The samples to be evaluated were fabricated in the following manner. To obtain the molded body, a Ni—Zn ferrite material is mixed with a binder resin, and the mixture was molded using a molding die. The molded body was then sintered at 850° C. in the atmosphere to obtain a rectangular column-shaped blank body made of a ferrite material. Two of these blank bodies were fabricated.

For one of the two blank bodies, laser processing was performed on the whole two surfaces among the surfaces that define the outer shape of the blank body. This laser processing was performed using ML-9100 manufactured by Amada Miyachi Co., Ltd. under the following laser irradiation conditions.

Power: 15 A

Irradiation probe speed: 3000 mm/s

Frequency: 100 kHz.

The surface of the blank body that has been laser processed under the above conditions is hereunder referred to as a laser processed surface.

Printing was then performed on the whole of one of the two laser processed surfaces of the blank body using a YV04 laser marker MD-X1000 manufactured by Keyence Corporation under the following printing conditions.

Power: 60%

Scan speed: 1250 mm/s

Frequency: 400 kHz

Specifically, a "■" mark was printed on the whole surface of one of the laser processed surfaces of the blank body. An area of the surface of the blank body that has been laser processed under the above conditions is hereunder referred to as a printed region. In the above example, the whole one surface of the blank body was the printed region. The printed region may be an area that occupies a part of a surface of the blank body.

The base body obtained in the above described way was designated as Sample A. Sample A was the base body that is formed of the Ni—Zn ferrite material and has the two laser processed surfaces, and one of the two laser processed surfaces had the "■" mark printed on the entire surface. Sample A corresponds to the base body 10 in the embodiment of the invention.

The "■" mark was also printed on the entire surface of the other rectangular column-shaped blank body made of the ferrite material without the above-described laser processing onto the surface using the ML-9100 manufactured by Amada Miyachi Co., Ltd. In other words, this laser printing was performed onto a non-laser processed surface (not the laser processed surface) of the base body. The base body obtained in the above described way was designated as Sample B. Sample B is not an example of the invention, but a comparative example.

A sample of a base body containing metal magnetic particles was prepared as follows. First, the metal magnetic particles formed of Fe—Si—Cr alloy and epoxy resin were kneaded to produce a mixed resin composition. The mixed resin composition was placed in a molding mold and a molding pressure of 1000 kN was applied to the composition to obtain a rectangular column-shaped molded body. Subsequently, the molded body was heated at 200° C. for 60 minutes to obtain the base body including the metal magnetic particles.

Among the surfaces defining the blank body fabricated as described above, laser processing was performed on the entire two surfaces among the surfaces. This laser processing was performed using ML-9100 manufactured by Amada Miyachi Co., Ltd. under the following laser irradiation conditions.

Power: 15 A

Irradiation probe speed: 3000 mm/s

Frequency: 100 kHz

Printing was then performed on the whole of one of the two laser processed surfaces of the blank body using a YV04 laser marker MD-X1000 manufactured by Keyence Corporation under the following printing conditions. Specifically, a "■" mark was printed on the entire surface of one of the laser processed surfaces of the blank body.

Power: 60%

Scan speed: 1250 mm/s

Frequency: 400 kHz

The base body obtained in the above described way was designated as Sample C. Sample C was the base body that was formed of the Ni—Zn ferrite material and had the two laser processed surfaces, and one of the two laser processed surfaces had the "■" mark printed on the entire surface. Sample C corresponds to the base body 10 in the embodiment of the invention.

Using a U-4100 spectrophotometer manufactured by Hitachi High-Tech Corporation, total reflection measurements were performed on each of Sample A, Sample B, and Sample C with Φ60-mm integrating sphere (10° of incident angle: standard integrating sphere for the same device). Reflectances of the laser processed surface(s) (corresponding to "low reflectance region 10B"), surfaces other than the laser processed surface(s) (referred to as an "unprocessed surface," the unprocessed surface corresponds to the "high reflectance region 10A"), and the printed region (corresponding to the "sign region 10C") of each sample were measured at 25° C. with a wavelength of 700 nmm. In the measurement of the reflectances, a barium sulfate white plate was used as a reference sample. The measurement results of the reflectance for the sign region 10C are shown in the following Table 1. Since Sample B did not have the laser-processed surface, the reflectance of the laser-processed surface of Sample B is denoted as "N/A" in the table.

TABLE 1

| | Reflectance of Unprocessed Surface (%) | Reflectance of Laser-processed Surface (%) | Reflectance of Sign Region (%) |
|---|---|---|---|
| Sample A (Example) | 35 | 10 | 52 |
| Sample B (Comparative) | 35 | N/A | 52 |
| Sample C (Example) | 28 | 6 | 56 |

When the printed region occupies a part of one surface of the sample (for example, when an alphabet(s) and/or number(s) are printed as in the case of the sign region 10C described above), the reflectance of the printed region can be estimated as follows. That is, the reflectance of the laser-processed surface (in the case of the example) or the unprocessed surface (in the case of the comparative example) of the blank body before the printed region is formed is measured using the same measurement method as described above with the U-4100 spectrophotometer of Hitachi High-Tech Corporation. The reflectance measured at this time is denoted as R1. Subsequently, the printed region is formed on one of the surfaces of the blank body, and the reflectance of the laser-processed surface (in the case of the example) or the unprocessed surface (in the case of the comparative example) on which the printed region is formed is measured using the same measurement method as above with the U-4100 spectrophotometer of Hitachi High Tech Corporation. The reflectance measured at this time is denoted as R2. An area Sa of the laser processed surface (in the case of the example) or the unprocessed surface (in the case of the comparative example) left after the printed region has been formed and an area Sb of the printed region are respectively determined. The reflectance R2 after the printed region is formed is expressed as a weighted average of the reflectance of the laser processed surface (in the case of the example) or unprocessed surface (in the case of the comparison example) and the reflectance of the printed region, weighted by their respective areas. Therefore, the reflectance R2 is expressed by the following equation where the reflectance of the printed region is Rx.

$$R2 = \frac{Sa}{Sa + Sb}R1 + \frac{Sb}{Sa + Sb}Rx \quad \text{[Formula 1]}$$

Since R1, R2, Sa, and Sb have been measured as described above, Rx can be calculated from the above equation. This Rx is used as an estimate of the reflectance of the printed region.

For each of Samples A and B, the arithmetic mean roughness Ra of the unprocessed surface, the laser-processed surface, and the printed region respectively were measured. As a result of the measurement, the arithmetic mean roughness Ra of the unprocessed surface was 0.15 μm, and the arithmetic mean roughness of the printed region was 0.1 μm. The arithmetic mean roughness Ra of the laser processed surface of Sample A was 0.40 μm. For Sample C, the arithmetic mean roughness Ra of the unprocessed surface, the laser processed surface, and the printed region respectively were measured. As a result of the measurement, the arithmetic mean roughness Ra of the unprocessed surface was 0.19 μm, the arithmetic mean roughness Ra of the laser processed surface was 0.36 μm, and the arithmetic mean roughness Ra of the printed region was 0.13 μm.

Next, characters "4R7" were printed on the laser-processed surface of the blank body made in the same way as Sample A, using the YV04 laser marker MD-X1000 manufactured by Keyence Corporation, under the following printing conditions.

Power: 60%

Scan speed: 1250 mm/s

Frequency: 400 kHz

The area where the characters "4RL" was formed is the printed region, and corresponds to the sign region 10C in the above embodiment. The base body obtained in this way was designated as Sample D. Sample D corresponds to the base body 10 in the embodiment of the invention.

Characters "4R7" were printed on one of the surfaces of the blank body made in the same way as Sample B, using the YV04 laser marker MD-X1000 manufactured by Keyence Corporation, under the same printing conditions. The base body obtained in this way was designated as Sample E. Sample E is not an example of the invention, but a comparative example.

Characters "4R7" were printed on the laser-processed surface of the blank body made in the same way as Sample C, using the YV04 laser marker MD-X1000 manufactured by Keyence Corporation, under the same printing conditions. The base body obtained in this way was designated as Sample F. Sample F corresponds to the base body 10 in the embodiment of the invention.

Figure 7A:
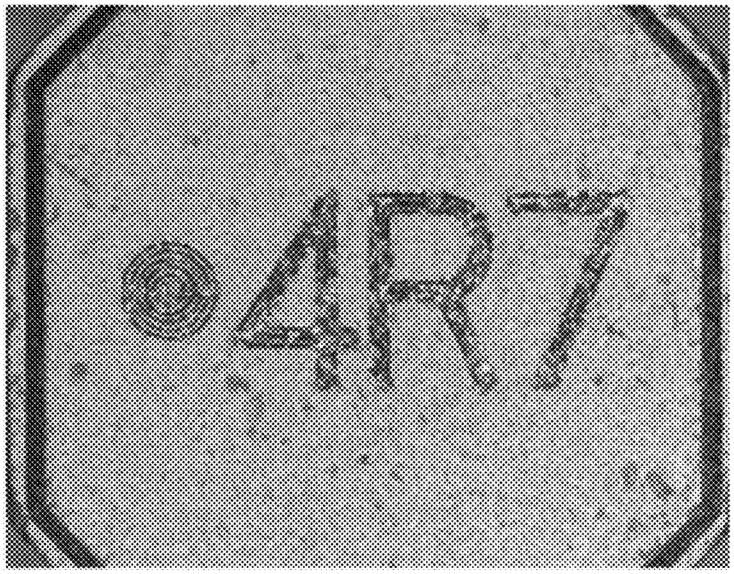
FIG. 7A is a photograph of a surface of a base body of a coil component according to an example of the invention.
Figure 7B:
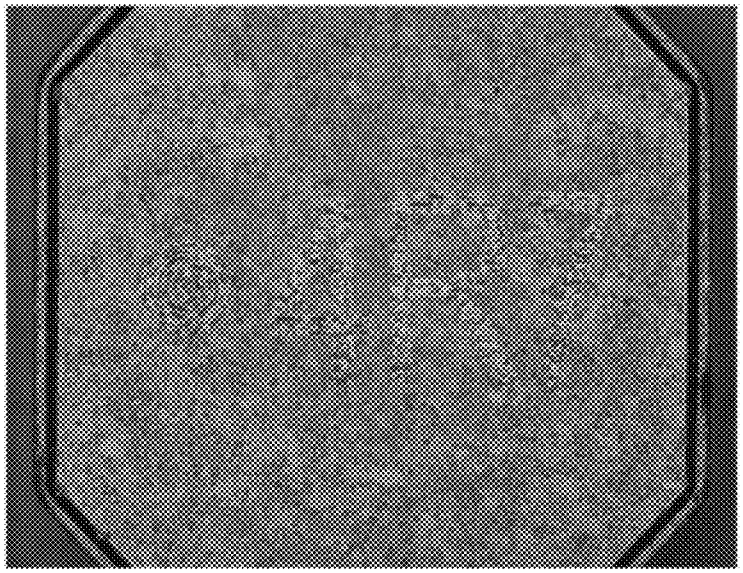
FIG. 7B is a photograph of a surface of a base body of a coil component according to a comparative example.
Figure 7C:
FIG. 7C is a photograph of a surface of a base body of a coil component according to an example of the invention.

An optical camera was used to photograph the surfaces on which "4R7" was printed for each of Sample D, Sample E, and Sample F. FIGS. 7A to 7C show the photographs taken by the camera. From the photographs of FIGS. 7A and 7C, it can be seen that the laser-processed surfaces of Sample D and Sample F (corresponding to the low reflectance region 10B) were brighter compared to the "4R7" print pattern. On the other hand, it can be seen from FIG. 7B that the laser-unprocessed surface of the base body made of the ferrite material was as bright as the "4R7" print pattern. For Sample D and Sample F, the contrast between the laser-processed surface and the print pattern was high so that it was easier to recognize the printed "4R7" as compared to Sample E. Whereas for Sample E, the contrast between the print pattern and its background (unprocessed surface) was low, and it was not easy to recognize the printed "4R7" as compared with Sample D and Sample F. In this way, by surrounding the area around the printed region on the surface of the base body with the laser-processed surface having a reflectance lower than that of the printed region, the contrast between the printed region and the surrounding laser-processed surface can be enhanced. It was confirmed that this makes it easier to recognize the printed region.

Samples A to C were also observed with the naked eye. Similar to the photographs of FIGS. 7A to 7C, in Samples A and C, the contrast between the sign region 10C and the low reflectance region 10B was high even when observed with the naked eye, and it was easy to recognize the characters "4R7" and the circular symbol on the left side of the characters. Whereas when sample B was observed with the naked eye, the contrast between the sign region 10C and the low reflectance region 10B was low as in FIG. 7B, and the characters "4R7" and the circle on the left side of the characters were not easily recognized.

Advantageous effects of the above embodiments will be now described. According to one or more embodiments of the present invention, the second reflectance of the low reflectance region 10B is lower than the third reflectance of the sign region 10C. Therefore the contrast between the sign region 10C and its surrounding low reflectance region 10B is high, and the sign region 10C can be easily distinguished from the surrounding region.

When the surface of the base body 10 of the coil component 1 is captured by an image capturing device such as an optical camera, the reflected light from the low reflectance region 10B received by an image sensor of the image capturing device includes a larger ratio of the diffusive reflection component rather than the specular reflection component compared to the sign region 10C. Therefore, it is not necessary to perform alignment of the image capturing device when the coil component 1 is photographed by the imaging capturing device in order to check the sign region 10C. The low reflectance region 10B is brightened in a photograph taken regardless of the arrangement of the image sensor of the image capturing device with respect to the light source. Further, when the sign region 10C of the coil component 1 is observed with the naked eye, the low reflectance region 10B looks whiter than the sign region 10C regardless of the direction in which the coil component 1 is observed. As described above, the contrast between the low reflectance region 10B and the sign region 10C can be enhanced to facilitate the recognition of the sign region 10C without adjusting the arrangement of the image capturing device or the position of the observer when observing with the naked eye.

According to one or more embodiments of the invention, the second reflectance of the low reflectance region 10B is lower than the first reflectance of the high reflectance region 10A, so that the contrast between the low reflectance region 10B and the high reflectance region 10A surrounding the low reflectance region 10B is high. Therefore, when observing the surface of the base body 10, the low reflectance region 10B can be easily found.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. A coil component comprising:

a non-conductive base body having on its outer surface a first region that has a first reflectance, a second region that has a second reflectance lower than the first reflectance, and a third region that is surrounded by the second region and has a third reflectance higher than the second reflectance, the third region has a shape of a sign, and wherein the first reflectance, the second reflectance, and third reflectance are determined via a relative reflectance measurement method that includes irradiating the base body with a measurement light and detecting light reflected from the outer surface of the base body;

a coil conductor provided in the non-conductive base body; and an external electrode provided on the non-conductive base body, wherein both the coil conductor and the external electrode are formed of conductive material.

2. The coil component of claim 1, wherein the second reflectance at a wavelength of 700 nm is 10% or less.

3. The coil component of claim 1, wherein the second reflectance at a wavelength of 700 nm is 1% or more.

4. The coil component of claim 1, wherein the sign includes at least one of a character, number or symbol.

5. The coil component of claim 1, wherein the outer surface of the non-conductive base body is defined by a plurality of surfaces, and wherein the second region occupies a whole one surface of the plurality of surfaces.

6. The coil component of claim 1, wherein the outer surface of the non-conductive base body is defined by a plurality of surfaces, and wherein the second region occupies a part of one surface of the plurality of surfaces.

7. The coil component of claim 1, wherein the non-conductive base body is formed of an Ni—Zn based ferrite material.

8. The coil component of claim 1, wherein the non-conductive base body is formed of a magnetic material containing metal magnetic particles.

9. A circuit board comprising the coil component of claim 1.

10. An electronic device comprising the circuit board of claim 9.

11. The coil component of claim 1, wherein the outer surface of the non-conductive base body is defined by a plurality of element surfaces, the first region is provided on one of the plurality of element surfaces.

12. The coil component of claim 1, wherein the second region is surrounded by the first region.

13. The coil component of claim 1, wherein the base body is formed of a material selected from the group consisting of: a ferrite material, magnetic particles bonded to each other by an oxide film, and magnetic particles bonded by binder resin.

* * * * *